(No Model.) 2 Sheets—Sheet 1.
W. CROOK, Sr.
AUXILIARY MOTOR FOR CARS.
No. 486,031. Patented Nov. 8, 1892.
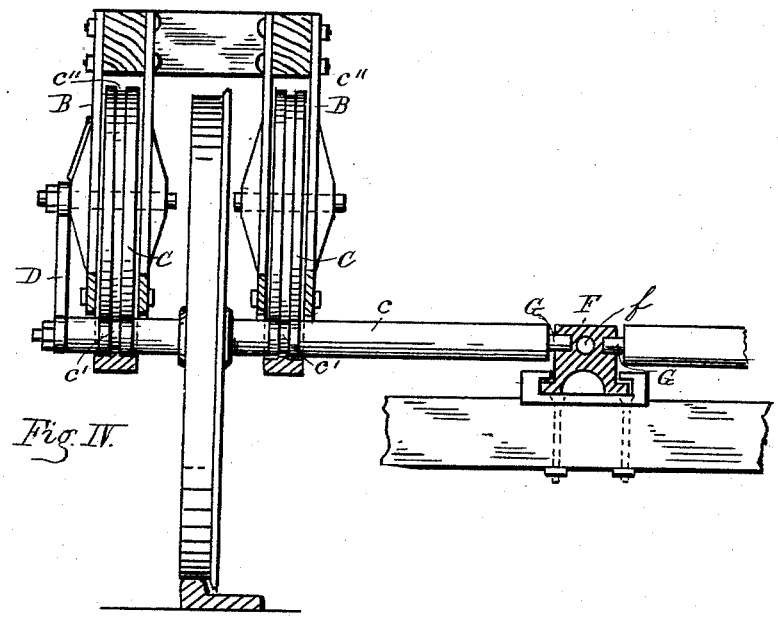
Fig. IV.
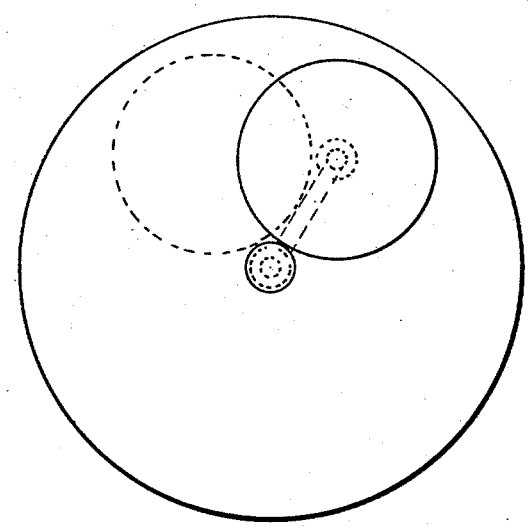
Fig. I.
Witnesses
R. S. Millar
Robert Kirk
Inventor
Wm. Crook Sr.
By O. J. Bailey Atty.
THE NORRIS PETERS CO., PHOTO-LITHO., WASHINGTON, D. C.

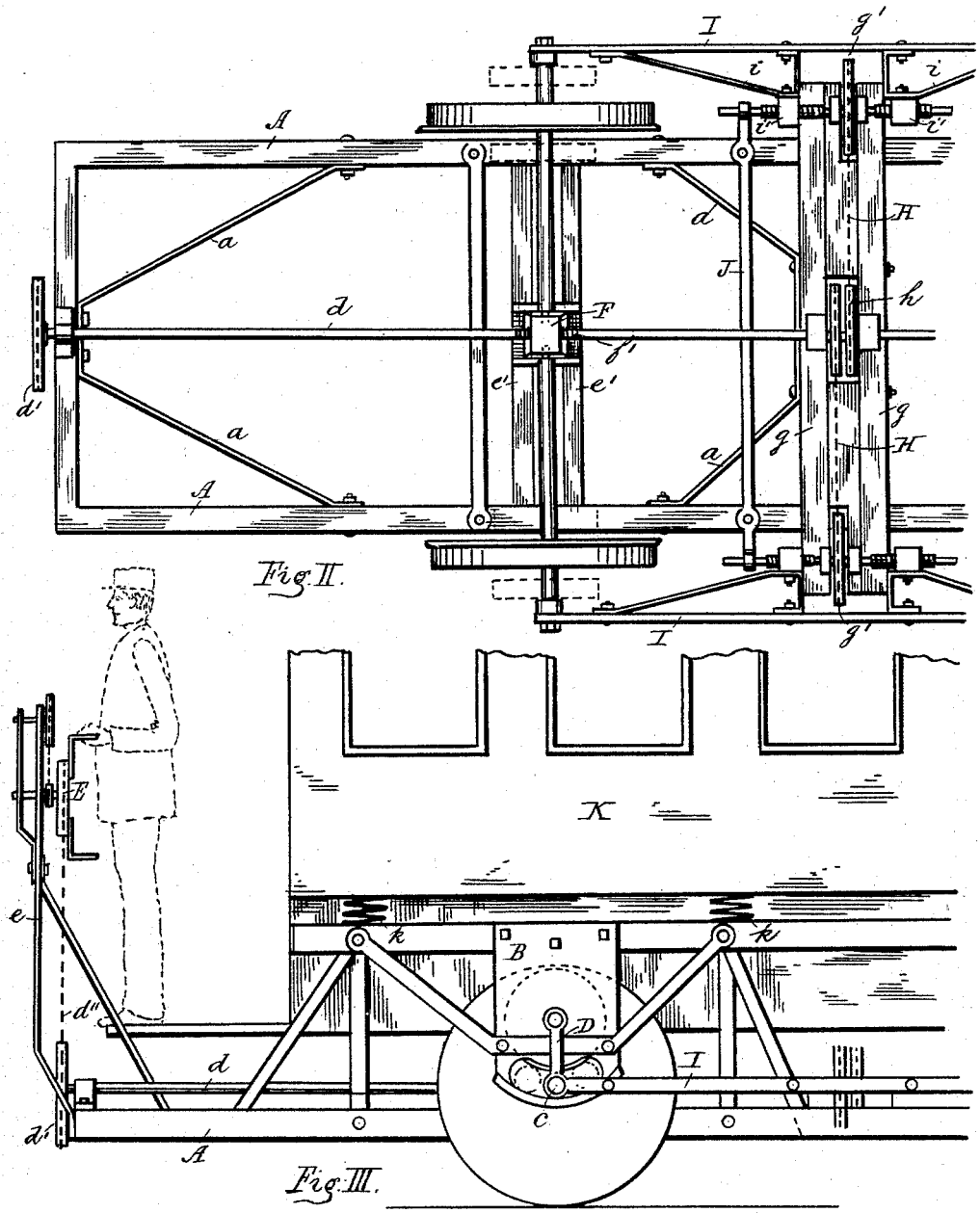

UNITED STATES PATENT OFFICE.

WILLIAM CROOK, SR., OF WINNIPEG, CANADA.

AUXILIARY MOTOR FOR CARS.

SPECIFICATION forming part of Letters Patent No. 486,031, dated November 8, 1892.

Application filed January 8, 1892. Serial No. 417,437. (No model.)

*To all whom it may concern:*

Be it known that I, WILLIAM CROOK, Sr., a subject of the Queen of Great Britain, residing at Winnipeg, in the Province of Manitoba and Dominion of Canada, have invented a new and useful Improvement in Auxiliary Motors, which improvement is fully set forth in the following specification and accompanying drawings, in which—

Figure I illustrates the principle of my invention; Fig. II, a plan view of the truck-gearing of a tram-car embodying my improved auxiliary motor; Fig. III, a side elevation of the same in conjunction with the body of a tram-car; and Fig. IV, a front view of one of the truck-wheels, showing its relation to the auxiliary bearing-wheels.

My invention relates to improvements in motive power; and its object is to provide a device whereby the force of gravity is utilized and made to co-operate with and reinforce the various motors employed for propelling locomotives, street-cars, or other wheeled vehicles.

In order to illustrate the operation of my invention, I have herein embodied it in a form especially applicable to a street or tram car, it being understood that the principle, with suitable modifications of detail, is equally adapted to wheel vehicles of every description.

The dominant feature of my invention consists in the arrangement of auxiliary wheels superimposed upon the axles of the truck-wheels. These wheels are journaled in yokes or housings, which are attached to the car-body and sustains the weight of the same. The lower peripheries of these bearing-wheels are adjusted in contact with and revolve upon the axle of the truck-wheels. Suitable mechanism is provided whereby the said axle may be retained at will in a perpendicular relation to the said bearing-wheels or swung to the front or rear thereof in an arc eccentric to the superimposed wheel-bearings, so that the bearing-point of the said wheels upon the axle may be shifted out of the perpendicular, and the weight of the car being thus thrown in front or rear, as desired, of the center of the axle to the truck-wheels the propelling-power is consequently reinforced by the gravity of the vehicle acting on one or the other side of the axle. The shifting of the axle is easily effected by mechanism controlled by a driver or brakeman who occupies the front platform of the car, provision being also made for simultaneously shifting both axles into a uniform bearing upon their respective points of contact with the superimposed auxiliary bearing-wheels.

The application of my invention will be understood by referring to the accompanying drawings, in which A designates the main frame, of oblong rectangular form, provided with suitable braces $a$. Depending from the upper part of this frame and rigidly attached thereto are bearing-yokes B, within which are journaled twin wheels C, whose peripheries are adjusted in contact with and adapted to roll upon the car-axle $c$. In order to prevent lateral displacement, collars $c'$ are formed upon the axle and engage grooves $c''$ in the peripheries of the twin bearing-wheels. The projecting spindle of the outer bearing-wheel and the extremity of the car-axle are respectively pivoted on the ends of a swinging link D, the operation of which will be hereinafter explained. A longitudinal shaft $d$ is journaled centrally within the framework and carries a wheel $d'$, operated by a belt or sprocket-chain $d''$, extending from a similar wheel E, supported on a vertical standard $e$ and controlled by the driver of the car. Transverse beams $e'$ are bolted at suitable intervals beneath the main axle and support a plate $e''$, having longitudinal guideways, which admit a sliding block F, having a threaded aperture $f$, which engages a worm $f'$ on the longitudinal shaft $d$. In order to permit independent action of the bearing-wheels and to facilitate the passage of the vehicle around curves, the axle is divided, as shown, and its inner ends provided with pivots G, which engage apertures in the sides of the sliding block F. Transverse parallel beams $g$ are bolted at or near the central part of the truck-frame and provided at their extremities with sprocket-wheel $g'$, having similarly-threaded spindles $g''$. These wheels are operated by chain belts H, leading from a double sprocket-wheel $h$, which is attached to the shaft $d$. Connecting-bars I have their extremities pivotally connected with the outer ends of the axles and also with the link D, which connects the axle with the bearing-wheels. The said connecting-bars extend rearwardly and are similarly connected to the rear axle, which is not shown in the drawings. Brackets $i$ are secured to the said bars and also to threaded nuts $i'$, which move upon the threaded spindles of the sprocket-wheels $g'$. The unthreaded ends of the spindles engage and move freely in eyes formed on the ends of a transverse bar J. The framework and the body of the car K are united by suitable springs $k$, which form the sole connection between them.

The operation of the mechanism will now be described. It will be observed that the shaft has no longitudinal motion, but when rotated by the brakeman the worm $f'$ forces the sliding block forward or back, as desired. Simultaneously the double sprocket-wheel and the mechanism connected therewith cause a precisely corresponding movement of the connecting-bars I. By this means the divided axles are kept in alignment and are at the same time adjusted and held in the desired relation to the superimposed auxiliary bearing-wheels. It will be observed that the action of the auxiliary wheels is controlled by their position with respect to the axle. If their bearing be perpendicular thereto, no effect is produced; but when the center of the axle is shifted to either side of the perpendicular the wheels necessarily bear upon one or the other of the downwardly-inclined sides of the axle, and the superincumbent weight of the body of the car is thus brought into action and added to the motive power employed to propel the vehicle.

What I claim as new is—

1. A mechanical power for wheel vehicles, consisting of the herein-described auxiliary wheels, and the divided axle upon which the auxiliary wheels are adjustably superposed, in combination with mechanism, as described, adapted to reinforce the power employed to propel the vehicle, substantially as herein set forth.

2. In a mechanical power, the herein-described auxiliary wheels superposed upon a divided axle, in combination with the threaded sliding block F, the rotatable shaft $d$, the sprocket-wheels $h$ and $g'$, the chain belts H, the threaded spindle $g''$, and connecting-bars I, all adapted to shift the bearing-point of the axle upon the auxiliary wheels and simultaneously to hold the sections of the divided axle in alignment, substantially as herein set forth.

In testimony that I claim the foregoing I have hereunto set my hand, this 18th day of December, 1891, in the presence of witnesses.

WILLIAM CROOK, Senr.

Witnesses:
CHARLES BALDWIN,
JAMES FERGUSON.